(12) United States Patent
Li et al.

(10) Patent No.: US 12,264,106 B2
(45) Date of Patent: Apr. 1, 2025

(54) CERIUM-ZIRCONIUM-ALUMINUM-BASED COMPOSITE MATERIAL, CGPF CATALYST AND PREPARATION METHOD THEREFOR

(71) Applicant: SINOCAT ENVIRONMENTAL TECHNOLOGY CO., LTD., Chengdu (CN)

(72) Inventors: Dacheng Li, Chengdu (CN); Jinfeng Wang, Chengdu (CN); Li Lan, Chengdu (CN); Hui Ye, Chengdu (CN); Lan Yang, Chengdu (CN); Feng Zhang, Chengdu (CN); Yi Yang, Chengdu (CN); Yongxiang Cheng, Chengdu (CN); Tiantian Luo, Chengdu (CN); Yinhua Dong, Chengdu (CN); Yun Wang, Chengdu (CN); Yun Li, Chengdu (CN); Qizhang Chen, Chengdu (CN)

(73) Assignee: SINOTECH COMPANY LIMITED, Chengdu (CN)

( * ) Notice: Subject to any disclaimer, the term of this patent is extended or adjusted under 35 U.S.C. 154(b) by 654 days.

(21) Appl. No.: 17/619,391

(22) PCT Filed: Jun. 17, 2020

(86) PCT No.: PCT/CN2020/096584
§ 371 (c)(1),
(2) Date: Dec. 15, 2021

(87) PCT Pub. No.: WO2020/253726
PCT Pub. Date: Dec. 24, 2020

(65) Prior Publication Data
US 2022/0363603 A1    Nov. 17, 2022

(30) Foreign Application Priority Data

Jun. 20, 2019   (CN) .......................... 201910538169.5

(51) Int. Cl.
| | | |
|---|---|---|
| B01J 21/04 | (2006.01) | |
| B01D 53/86 | (2006.01) | |
| B01J 21/06 | (2006.01) | |
| B01J 23/10 | (2006.01) | |
| B01J 37/02 | (2006.01) | |
| B01J 37/04 | (2006.01) | |
| B01J 37/08 | (2006.01) | |
| C04B 35/119 | (2006.01) | |
| F01N 3/10 | (2006.01) | |

(52) U.S. Cl.
CPC .......... *C04B 35/119* (2013.01); *B01D 53/865* (2013.01); *B01D 53/8653* (2013.01); *B01J 21/04* (2013.01); *B01J 21/066* (2013.01); *B01J 23/10* (2013.01); *B01J 37/0215* (2013.01); *B01J 37/04* (2013.01); *B01J 37/08* (2013.01); *F01N 3/101* (2013.01); *C04B 2235/3217* (2013.01); *C04B 2235/3229* (2013.01); *C04B 2235/3244* (2013.01)

(58) Field of Classification Search
CPC . B01J 21/04; B01J 21/066; B01J 23/10; B01J 37/0215; B01J 37/04; B01J 37/08; F01N 3/101; B01D 53/865; B01D 53/8653; C04B 35/119
USPC .......................... 502/302–304, 349, 355, 415
See application file for complete search history.

(56) References Cited

U.S. PATENT DOCUMENTS

| | | | | |
|---|---|---|---|---|
| 6,174,511 | B1 * | 1/2001 | Tsukada | C01F 7/34 502/355 |
| 6,852,665 | B2 * | 2/2005 | Morikawa | B01J 37/031 502/340 |
| 7,393,808 | B2 * | 7/2008 | Yoshida | B01J 23/63 502/349 |
| 7,871,956 | B2 * | 1/2011 | Wakita | B01J 23/10 423/594.12 |
| 8,187,995 | B2 * | 5/2012 | Wakita | B01D 53/945 502/304 |

(Continued)

FOREIGN PATENT DOCUMENTS

| | | | | |
|---|---|---|---|---|
| CA | 3125854 | A1 * | 8/2020 | ............. B01D 53/86 |
| CN | 1436592 | A | 8/2003 | |
| CN | 106179359 | A | 12/2016 | |

(Continued)

OTHER PUBLICATIONS

International Search Report for International Application No. PCT/CN2020/096584 dated Aug. 27, 2020; 3 pgs.; China National Intellectual Property Administration (ISA/CN); Beijing, China.

*Primary Examiner* — Cam N. Nguyen
(74) *Attorney, Agent, or Firm* — Andrew D. Fortney; Central California IP Group, P.C.

(57) ABSTRACT

A cerium-zirconium-aluminum-based composite material, a cGPF catalyst and a preparation method thereof are provided. The cerium-zirconium-aluminum-based composite material adopts a stepwise precipitation method, firstly preparing an aluminum-based pre-treated material, then coprecipitating the aluminum-based pre-treated material with zirconium and cerium sol, and finally roasting at high temperature to obtain the cerium-zirconium-aluminum-based composite material. The cerium-zirconium-aluminum-based composite material has better compactness and higher density, and when it is used in cGPF catalyst, it occupies a smaller volume of pores on the catalyst carrier, such that cGPF catalyst has lower back pressure and better ash accumulation resistance, which is beneficial to large-scale application of cGPF catalyst.

2 Claims, No Drawings

(56) References Cited

U.S. PATENT DOCUMENTS 9,931,614 B2 * 4/2018 Morikawa ................ B01J 37/16
11,613,473 B2 * 3/2023 Harris .................... B01J 37/031
                                                              423/213.2

FOREIGN PATENT DOCUMENTS

| CN | 106946282 A | 7/2017 | | |
|----|-------------|--------|---|---|
| CN | 108561211 A | 9/2018 | | |
| CN | 109876793 A | 6/2019 | | |
| JP | 2003126694 A | 5/2003 | | |
| WO | WO-2018115436 A1 * | 6/2018 | ........... | B01D 53/945 |

* cited by examiner

CERIUM-ZIRCONIUM-ALUMINUM-BASED COMPOSITE MATERIAL, CGPF CATALYST AND PREPARATION METHOD THEREFOR

This application claims the benefit of Chinese Patent Application No. 201910538169.5, filed Jun. 20, 2019.

TECHNICAL FIELD OF INVENTION

The invention relates to the field of exhaust emissions purification materials, in particular to a cerium-zirconium-aluminum-based composite material, a cGPF catalyst and a preparation method thereof.

BACKGROUND

Exhaust emissions from gasoline engines are one of the main sources of urban pollution in China. The main pollutants in exhaust emissions from gasoline engines are carbon monoxide (CO), hydrocarbons (HC), nitrogen oxides ($NO_x$) and particulate matter (PM). With the increasingly urgent energy and environmental problems, in order to protect the environment, China has put forward higher requirements for the emission of motor vehicle exhaust. China will soon implement the National Emission Standard VI in 2020, and many regions even advance the implementation of regulations to 2019. The National Emission Standard VI takes the concentration of particulate matter in exhaust as an important limiting standard, such that controlling the concentration of particulate matter in exhaust emissions will become the focus of gasoline engine exhaust purification in the future. However, the traditional three-way catalyst (TWC) can only effectively purify CO, HC and $NO_x$ in the exhaust emissions, but can't control the concentration of particulate matter in the exhaust emissions. Therefore, it can be predicted that the gasoline engine particulate trap catalyst (also known as catalyzed Gasoline Particulate Filter, cGPF), which can significantly reduce the concentration of particulate matter in the exhaust emissions, will be widely used.

Although the composition of particulate matter in gasoline engine is complicated, most of the components can be removed by combustion (such as cGPF catalyst), such that the emission concentration of particulate matter can be controlled, and the exhaust emissions of gasoline engine can reach the National Emission Standard VI. However, soot and other components in particulate matter will eventually be converted into non-combustible ash after combustion, which will be deposited in the pores of cGPF catalyst, resulting in the increase of catalyst back pressure and the decline of catalyst performance, which will eventually lead to the failure or safety risk of cGPF catalyst. Therefore, improving the high ash accumulation-resistant ability of cGPF catalyst is the necessary guarantee to reduce the catalyst back pressure, maintain the catalytic performance and reduce the safety risk.

At present, most of the catalyst coatings in cGPF catalysts are made of mixed cerium-zirconium-based materials and alumina-based materials. It has excellent purification effect on the particulate matter of gasoline engine, and it can effectively control the emission concentration of particulate matter and make the exhaust emissions of gasoline engine meet China VI vehicle emission standards. However, due to its low density and large volume, it will occupy a larger volume of the channel after being filled into the channel of cGPF carrier, thus reducing the pore diameter and pore volume, leading to the increase of catalyst back pressure and the decrease of ash accumulation resistance, which is unfavorable to cGPF.

SUMMARY OF THE INVENTION

An object of the present invention is to overcome the defect of poor ash accumulation resistance of cGPF catalyst caused by excessive pore volume of catalyst carrier occupied by cerium-zirconium-based materials and alumina-based materials in existing cGPF catalysts, and to provide a cerium-zirconium-aluminum-based composite material, a cGPF catalyst and a preparation method thereof. According to the invention, a cerium-zirconium-aluminum-based composite material is obtained by first preparing an aluminum-based pre-treated material by a stepwise precipitation method, then co-precipitating with zirconium and cerium sol, and finally high-temperature roasting. The cerium-zirconium-aluminum-based composite material has better compactness and higher density, and when it is used in the cGPF catalyst, the volume of pores on the catalyst carrier occupied is smaller, such that the cGPF catalyst has lower back pressure and better ash accumulation resistance, which is beneficial to the large-scale application of the cGPF catalyst.

In order to achieve the object of the invention, the invention provides a preparation method of cerium-zirconium-aluminum-based composite material, which comprises the following steps:

(1) Dissolving pseudo-boehmite in citric acid aqueous solution, adjusting the pH value to 4-10 with ammonia water, filtering and drying after the reaction under stirring is completed to obtain a precipitate; roasting the precipitate at a temperature of 200-400° C. for 0.1-5 h to obtain a pre-treated material; wherein the mass ratio of pseudo boehmite to citric acid is 5-20:1;

(2) Adding the pre-treated material into a solution of mixed sol, adjusting the pH value to 4-10 with ammonia water after completely dissolution, filtering and drying after the reaction under stirring is completed to obtain a mixture precipitate; wherein the mixed sol is a sol containing cerium ions and zirconium ions;

(3) Roasting the mixture precipitate at 500-600° C. for 1-10 h, and then at 800-1100° C. for 1-10 h to obtain the cerium-zirconium-aluminum composite material.

Preferably, in Step (1), the mass fraction of citric acid in the citric acid aqueous solution is 5-20%. Under the preferable citric acid mass fraction is higher, the reaction speed is faster, and the reaction is more thorough.

Preferably, the concentration of ammonia water in Steps (1) and (2) is 20-30 wt %. Under the preferable ammonia concentration, the reaction speed is controllable and the reaction period becomes shorter, and the obtained cerium-zirconium-aluminum composite material has better catalytic purification effect on exhaust emissions.

Preferably, the drying temperature in Steps (1) and (2) is 60-150° C., and the time is 1-12 h. Under the preferable drying temperature and time, the drying speed is faster, the energy consumption is lower, and the drying resultant is not subjected to chemical reaction due to high temperature.

Preferably, the mixed sol in Step (2) is a sol which further contains one or more selected from the group consisting of yttrium ion, lanthanum ion, neodymium ion, praseodymium ion, palladium ion and strontium ion. The preferred mixed sol contains more rare earth elements and has lower density, and the prepared cerium-zirconium-aluminum-based composite has better catalytic purification effect on exhaust emission.

In order to achieve the above object, furthermore, the present invention provides a cerium-zirconium-aluminum-based composite material, which is prepared by the above preparation method.

Preferably, the cerium-zirconium-aluminum-based composite material comprises the following components: 4-30 wt % of $CeO_2$, 1-30 wt % of $ZrO_2$, 40-95 wt % of $Al_2O_3$ and 0-20 wt % of rare earth metal oxide. Most preferably, the cerium-zirconium-aluminum-based composite material comprises the following components: 10-20 wt % of $CeO_2$, 5-15 wt % of $ZrO_2$, 60-75 wt % of $Al_2O_3$ and 5-10 wt % of rare earth metal oxide. The rare earth metal oxide comprises one or more selected from the group consisting of $Y_2O_3$, $La_2O_3$, $Nd_2O_3$, $Pr_6O_{11}$, BaO and SrO. The composition of the material affects the performance of the material. The preferred composition of cerium-zirconium-aluminum-based composite material has larger specific surface area, larger pore volume and higher density, which is more beneficial to reduce the occupation of the pore volume on the catalyst carrier by the coating, thus better reducing the catalyst back pressure, improving the ash accumulation resistance and better catalytic purification effect on the exhaust emission.

Preferably, the specific surface of the cerium-zirconium-aluminum-based composite material is 50-200 $m^2/g$. Most preferably, the specific surface of the cerium-zirconium-aluminum-based composite material is 80-120 $m^2/g$. The specific surface area of the material is inversely proportional to the density, and the larger the specific surface area, the larger the contact area with the exhaust emission, the better the catalytic purification effect. On the contrary, the smaller the material density, the larger the proportion of the coating to the pores of the catalyst carrier, and the worse the ash accumulation resistance. The preferred specific surface area of the cerium-zirconium-aluminum-based composite material can make the catalyst have good catalytic purification effect on the exhaust emission and simultaneously ensure the good ash accumulation resistance.

Preferably, the pore volume of the cerium-zirconium-aluminum-based composite material is 0.2-2.0 ml/g. Most preferably, the pore volume of the cerium-zirconium-aluminum-based composite material is 0.4-1.5 ml/g. The pore volume of the material is inversely proportional to the density, and the larger the pore volume, the larger the contact surface with the exhaust emission, the better the catalytic purification effect. On the contrary, the smaller the density, the larger the proportion of pores in the catalyst carrier, and the worse the ash accumulation resistant ability. Under the preferable pore volume, the cerium-zirconium-aluminum composite material can make the catalyst have good catalytic purification effect on the exhaust emission and ensure the ash accumulation resistant ability.

Preferably, the density of the cerium-zirconium-aluminum-based composite material is 0.5-1.5 g/ml. Most preferably, the density of the cerium-zirconium-aluminum-based composite material is 0.8-1.2 ml/g. The density of the material is inversely proportional to the pore volume and specific surface area. The higher the density, the smaller the proportion of pores in the catalyst carrier, and the better the ash accumulation resistant ability. On the contrary, the higher the density, the smaller the specific surface area and pore volume, the smaller the contact area with the exhaust emission, and the worse the catalytic purification effect. Under the preferable density, the cerium-zirconium-aluminum-based composite material, can make the catalyst have good ash accumulation resistant ability and good catalytic purification effect on the exhaust emission.

Furthermore, the invention provides a cGPF catalyst, and the catalyst coating of the cGPF catalyst contains the cerium-zirconium-aluminum-based composite material.

Furthermore, the invention provides a preparation method of cGPF catalyst, which comprises the following steps:

(1) Preparing slurry: mixing and ball-milling cerium-zirconium-aluminum-based composite material, cerium-zirconium-based material, aluminum sol and deionized water, adding pore-forming agent, mixing and ball-milling, adding palladium salt solution and rhodium salt solution, mixing and ball-milling to obtain coating slurry;

(2) Coating: coating the coating slurry on the catalyst carrier;

(3) Roasting: drying and roasting the coated catalyst carrier to obtain cGPF catalyst.

Among others, preferably, the cerium-zirconium-based material in Step (1) comprises 20-80 wt % of $CeO_2$, 10-70 wt % of $ZrO_2$ and 0-10 wt % of rare earth metal oxide. The rare earth metal oxide comprises one or more selected from the group consisting of $Y_2O_3$, $La_2O_3$, $Nd_2O_3$, $Pr_6O_{11}$, BaO and SrO. The preferable cerium-zirconium-based material has better catalytic performance, and the obtained cGPF catalyst has better comprehensive performance.

Among others, preferably, the mass ratio of the cerium-zirconium-aluminum-based composite material to the cerium-zirconium-based material in Step (1) is 1.3-3.1. The preferable mass ratio of cerium-zirconium-aluminum-based composite material to cerium-zirconium-based material can make the catalyst not only have good ash accumulation resistance, but also have good catalytic purification effect on exhaust emission.

Among others, preferably, the amount of aluminum sol in Step (1) is 1-5% of the total mass of the slurry. Under the preferable amount of aluminum sol, the coating is not easy to fall off, which can make the catalyst not only have good ash accumulation resistance, but also have good catalytic purification effect on exhaust emission.

Among others, preferably, the amount of pore-forming agent in Step (1) is 1-20% of the mass of the slurry. Under the preferable amount of pore-forming agent, it shows good pore-forming effect and low density of catalyst coating, which can make the catalyst have good ash accumulation resistance and catalytic purification effect on exhaust emission.

Among others, preferably, the pore-forming agent is one or more selected from the group consisting of polyether, polyester, polyamide, polyurethane, cellulose, saccharide, polyethylene and polystyrene. The preferable pore-forming agent has good pore-forming effect and little influence on the ash accumulation resistance of cGPF catalyst.

Among others, preferably, in Step (1), the particle size $D_{50}$ of the coating slurry is not higher than 5 μm. Most preferably, the particle size $D_{50}$ of the coating slurry is 2-3 μm. The preferable coating slurry has good particle size, good coatability and more uniform coating.

Among others, preferably, in Step (1), the solid content of the coating slurry is 20-40 wt %. The preferable coating slurry has good solid content, good coatability and more uniform coating.

Among others, preferably, in Step (2), the coating amount of the coating slurry is 20-140 g/L. Most preferably, the coating amount of the coating slurry is 60-100 g/L.

The preferable coating amount occupies a small pore volume of the catalyst carrier, and at the same time, the thickness of the catalyst coating can be ensured, such that the catalyst has good ash accumulation resistance and good catalytic purification effect on the exhaust emission.

Among others, preferably, in Step (3), the drying temperature is 90-150° C. and the drying time is 3-10 h. Under the preferable drying temperature, low energy consumption is lower and time period is shorter, which does not affect the adhesion of the coating.

Among others, preferably, in Step (3), the roasting temperature is 500-600° C. and the roasting time is 1-4 h. Under the preferable roasting temperature, the energy consumption is lower, and the time period is shorter, and the catalyst performance is stable.

Compared with the prior art, the beneficial effects of the invention include,

1. The preparation method of the invention utilizes the method of combining stepwise precipitation and co-precipitation to increase the density of the cerium-zirconium-aluminum-based composite material, and the density of the prepared cerium-zirconium-aluminum-based composite material is smaller.

2. The cerium-zirconium-aluminum-based composite material prepared by the invention can be used in cGPF catalyst, which can reduce the volume of pore channels of catalyst carrier, thereby reducing the back pressure of cGPF catalyst and increasing the ash accumulation resistance of cGPF catalyst.

3. The preparation method of the cerium-zirconium-aluminum-based composite material is simple and reliable, and is suitable for large-scale production of the cerium-zirconium-aluminum-based composite material.

4. The cerium-zirconium-aluminum-based composite material contained in the cGPF catalyst of the present invention has higher density, smaller occupied pore volume of catalyst carrier, lower back pressure and stronger ash accumulation resistance.

5. The preparation method of cGPF catalyst is simple and reliable, which is suitable for large-scale production of cGPF catalyst.

DETAILED DESCRIPTION OF EMBODIMENTS

The present invention will be further described in detail below with reference to test examples and specific embodiments. However, it should not be understood that the scope of the above subject matter of the present invention is only limited to the following examples, and all technologies realized based on the content of the present invention belong to the scope of the present invention.

Example 1

A cerium-zirconium-aluminum-based composite material was consisted of the following components: 20% $CeO_2$, 25% $ZrO_2$, 2.5% $La_2O_3$, 2.5% $Y_2O_3$ and 50% $Al_2O_3$. The preparation method was as follows:
(1) Dissolving pseudo-boehmite in 10% by mass citric acid aqueous solution, adjusting pH value to 7 with ammonia water, filtering and drying to obtain a precipitate after the reaction under stirring was completed; roasting the precipitate at 300° C. for 3 h to obtain a pre-treated material;
(2) Adding the pre-treated materials into a solution of mixed sol of cerium, zirconium, lanthanum and yttrium (usually hydroxide sol, for example, prepared by mixing salts and reacting with alkali such as ammonia water), adjusting the pH value to 7 with ammonia water after completely dissolution, filtering and drying after the reaction under stirring was completed to obtain mixture precipitate;
(3) Roasting the mixture precipitate at 550° C. for 5 h, and then at 1000° C. for 3 h to obtain the cerium-zirconium-aluminum-based composite.

Through testing, the cerium-zirconium-aluminum-based composite had a specific surface of 76.2 $m^2/g$, a pore volume of 0.8 ml/g, and a density of 1.23 g/ml.

Example 2

A cerium-zirconium-aluminum-based composite material was consisted of the following components: 20% $CeO_2$, 25% $ZrO_2$, 2.5% $La_2O_3$, 2.5% $Y_2O_3$ and 50% $Al_2O_3$. The preparation method was as follows:
(1) Dissolving pseudo boehmite in 5% by mass citric acid aqueous solution, adjusting pH value to 4 with ammonia water, filtering and drying to obtain a precipitate after the reaction under stirring was completed; roasting the precipitate at 200° C. for 5 h to obtain a pre-treated material;
(2) Adding the pre-treated material into a solution of mixed sol of cerium, zirconium, lanthanum and yttrium, adjusting the pH value to 4 with ammonia water after completely dissolution, filtering and drying after the reaction under stirring was completed to obtain a mixture precipitate;
(3) Roasting the mixture precipitate at 500° C. for 10 h, and then at 1100° C. for 1 h to obtain the cerium-zirconium-aluminum-based composite material.

Through testing, the cerium-zirconium-aluminum-based composite had a specific surface of 74.8 $m^2/g$, a pore volume of 0.73 ml/g, and a density of 1.25 g/ml.

Example 3

A cerium-zirconium-aluminum-based composite material was consisted of the following components: 20% $CeO_2$, 25% $ZrO_2$, 2.5% $La_2O_3$, 2.5% $Y_2O_3$ and 50% $Al_2O_3$. The preparation method was as follows:
(1) Dissolving pseudo-boehmite in 15% by mass citric acid aqueous solution, adjusting pH value to 10 with ammonia water, filtering and drying to obtain a precipitate after the reaction under stirring was completed; roasting the precipitate at 400° C. for 0.1 h to obtain a pre-treated material;
(2) Adding the pre-treated material into a solution of mixed sol of cerium, zirconium, lanthanum and yttrium, adjusting the pH value to 10 with ammonia water after completely dissolution, filtering and drying after the reaction under stirring was completed to obtain a mixture precipitate;
(3) Roasting the mixture precipitate at 600° C. for 1 h, and then at 800° C. for 10 h to obtain the cerium-zirconium-aluminum-based composite material.

Through testing, the cerium-zirconium-aluminum-based composite had a specific surface of 78.5 $m^2/g$, a pore volume of 0.83 ml/g, and a density of 1.21 g/ml.

Example 4

A cerium-zirconium-aluminum-based composite material was consisted of the following components: 10% $CeO_2$, 10% $ZrO_2$, 2.5% $La_2O_3$, 2.5% $Y_2O_3$ and 75% $Al_2O_3$. The preparation method was as follows:
(1) Dissolving pseudo-boehmite in 12% by mass citric acid aqueous solution, adjusting pH value to 7 with ammonia water, filtering and drying to obtain a precipitate after the reaction under stirring was completed; roasting the precipitate at 300° C. for 3 h to obtain a pre-treated material;
(2) Adding the pre-treated material into a solution of mixed sol of cerium, zirconium, lanthanum and yttrium, adjusting the pH value to 7 with ammonia water after completely dissolution, filtering and drying after the reaction under stirring was completed to obtain a mixture precipitate;
(3) Roasting the mixture precipitate at 550° C. for 5 h, and then at 1000° C. for 3 h to obtain the cerium-zirconium-aluminum-based composite.

Through testing, the cerium-zirconium-aluminum-based composite had a specific surface of 92.3 m²/g, a pore volume of 0.89 ml/g, and a density of 1.13 g/ml.

Example 5

A cerium-zirconium-aluminum-based composite material was consisted of the following components: 10% $CeO_2$, 10% $ZrO_2$, 2.5% $La_2O_3$, 2.5% $Y_2O_3$ and 75% $Al_2O_3$. The preparation method was as follows:
(1) Dissolving pseudo-boehmite in 10% by mass citric acid aqueous solution, adjusting pH value to 4 with ammonia water, filtering and drying to obtain a precipitate after the reaction under stirring was completed; roasting the precipitate at 200° C. for 5 h to obtain a pre-treated material;
(2) Adding the pre-treated material into a solution of mixed sol of cerium, zirconium, lanthanum and yttrium, adjusting the pH value to 4 with ammonia water after completely dissolution, filtering and drying after the reaction under stirring was completed to obtain a mixture precipitate;
(3) Roasting the mixture precipitate at 500° C. for 10 h, and then at 1100° C. for 1 h to obtain the cerium-zirconium-aluminum-based composite material.

Through testing, the cerium-zirconium-aluminum-based composite had a specific surface of 91.8 m²/g, a pore volume of 0.87 ml/g, and a density of 1.14 g/ml.

Example 6

A cerium-zirconium-aluminum-based composite material was consisted of the following components: 10% $CeO_2$, 10% $ZrO_2$, 2.5% $La_2O_3$, 2.5% $Y_2O_3$ and 75% $Al_2O_3$. The preparation method was as follows:
(1) Dissolving pseudo-boehmite in 20% by mass citric acid aqueous solution, adjusting pH value to 10 with ammonia water, filtering and drying to obtain a precipitate after the reaction under stirring was completed; roasting the precipitate at 400° C. for 0.1 h to obtain a pre-treated material;
(2) Adding the pre-treated material into a solution of mixed sol of cerium, zirconium, lanthanum and yttrium, adjusting the pH value to 10 with ammonia water after completely dissolution, filtering and drying after the reaction under stirring was completed to obtain a mixture precipitate;
(3) Roasting the mixture precipitate at 600° C. for 1 h, and then at 800° C. for 10 h to obtain the cerium-zirconium-aluminum-based composite material.

Through testing, the cerium-zirconium-aluminum-based composite had a specific surface of 95.3 m²/g, a pore volume of 0.91 ml/g, and a density of 1.11 g/ml.

Comparative Example 1

A cerium-zirconium-aluminum composite material was obtained by directly mixing 20% $CeO_2$, 25% $ZrO_2$, 2.5% $La_2O_3$, 2.5% $Y_2O_3$ and 50% $Al_2O_3$.
Through testing, the cerium-zirconium-aluminum composite material had a specific surface of 103.2 m²/g, a pore volume of 0.97 ml/g, and a density of 1.06 g/ml.

Comparative Example 2

A cerium-zirconium-aluminum-based composite material was consisted of the following components: 20% $CeO_2$, 25% $ZrO_2$, 2.5% $La_2O_3$, 2.5% $Y_2O_3$ and 50% $Al_2O_3$. The preparation method was as follows:
(1) Dissolving pseudo-boehmite in 10% by mass citric acid aqueous solution, adding into mixed sol solution of cerium, zirconium, lanthanum and yttrium, adjusting pH value to 7 with ammonia water after completely dissolution, filtering and drying after the reaction under stirring was completed to obtain mixture precipitate;
(2) Roasting the mixture precipitate at 550° C. for 5 h, and then at 1000° C. for 3 h to obtain the cerium-zirconium-aluminum-based composite.

Through testing, the cerium-zirconium-aluminum-based composite had a specific surface of 93.7 m²/g, a pore volume of 0.90 ml/g, and a density of 1.12 g/ml.

Comparative Example 3

A cerium-zirconium-aluminum-based composite material was consisted of the following components: 20% $CeO_2$, 25% $ZrO_2$, 2.5% $La_2O_3$, 2.5% $Y_2O_3$ and 50% $Al_2O_3$. The preparation method was as follows:
(1) Dissolving pseudo-boehmite in 10% by mass citric acid aqueous solution, adjusting pH value to 7 with ammonia water, filtering and drying to obtain a precipitate after the reaction under stirring was completed; roasting the precipitate at 300° C. for 3 h to obtain a pre-treated material;
(2) Adjusting the pH value of a solution of mixed sol of cerium, zirconium, lanthanum and yttrium to 7 with ammonia water, filtering and drying after the reaction under stirring was completed to obtain a mixture precipitate;
(3) After mixing and homogenizing the mixture precipitation and pre-treated materials, roasting at 550° C. for 5 h, and then at 1000° C. for 3 h to obtain the cerium-zirconium-aluminum-based composite material.

Through testing, the cerium-zirconium-aluminum-based composite had a specific surface of 96.8 m²/g, a pore volume of 0.93 ml/g, and a density of 1.09 g/ml.

Comparative Example 4

A cerium-zirconium-aluminum composite material was obtained by directly mixing 10% $CeO_2$, 10% $ZrO_2$, 2.5% $La_2O_3$, 2.5% $Y_2O_3$ and 75% $Al_2O_3$.
Through testing, the cerium-zirconium-aluminum composite material had a specific surface of 134.3 m²/g, a pore volume of 1.31 ml/g, and a density of 0.83 g/ml.

Comparative Example 5

A cerium-zirconium-aluminum-based composite material was consisted of the following components: 10% $CeO_2$, 10% $ZrO_2$, 2.5% $La_2O_3$, 2.5% $Y_2O_3$ and 75% $Al_2O_3$. The preparation method was as follows:

(1) Dissolving pseudo-boehmite in 10% by mass citric acid aqueous solution, adding into mixed sol solution of cerium, zirconium, lanthanum and yttrium, adjusting pH value to 7 with ammonia water after completely dissolution, filtering and drying after the reaction under stirring was completed to obtain mixture precipitate;

(2) Roasting the mixture precipitate at 550° C. for 5 h, and then at 1000° C. for 3 h to obtain the cerium-zirconium-aluminum-based composite.

Through testing, the cerium-zirconium-aluminum-based composite had a specific surface of 125.7 $m^2/g$, a pore volume of 1.26 ml/g, and a density of 0.87 g/ml.

Comparative Example 6

A cerium-zirconium-aluminum-based composite material was consisted of the following components: 10% $CeO_2$, 10% $ZrO_2$, 2.5% $La_2O_3$, 2.5% $Y_2O_3$ and 75% $Al_2O_3$. The preparation method was as follows:

(1) Dissolving pseudo-boehmite in 10% by mass citric acid aqueous solution, adjusting pH value to 7 with ammonia water, filtering and drying to obtain a precipitate after the reaction under stirring was completed; roasting the precipitate at 300° C. for 3 h to obtain a pre-treated material;

(2) Adjusting the pH value of a solution of mixed sol of cerium, zirconium, lanthanum and yttrium to 7 with ammonia water, filtering and drying after the reaction under stirring was completed to obtain a mixture precipitate;

(3) After mixing and homogenizing the mixture precipitation and pre-treated materials, roasting at 550° C. for 5 h, and then at 1000° C. for 3 h, to obtain the cerium-zirconium-aluminum-based composite material.

Through testing, the cerium-zirconium-aluminum-based composite had a specific surface of 128.4 $m^2/g$, a pore volume of 1.28 ml/g, and a density of 0.85 g/ml.

Preparation of the cGPF Catalysts (1) Preparing slurry: mixing cerium-zirconium-aluminum-based composite materials (prepared from Examples 1-6 or Comparative Examples 1-6) and cerium-zirconium-based materials (40% $CeO_2$, 50% $ZrO_2$, 5% $La_2O_3$, 5% $Y_2O_3$) in a ratio of 1:1, and then adding aluminum sol (2% of slurry content) and polyurethane (2% of slurry content) and deionized water, adding rhodium nitrate solution (to ensure the Rh content density in the coating is 5 $g/ft^3$), ball milling and stirring for 5 min to prepare coating slurry, and controlling the particle size $D_{50}$ of the slurry to be 2.4 μm and the solid content to be 33 wt %;

(2) Coating: coating the coating slurry on the wall-flow cordierite carrier with a coating height of 90% of the carrier height and a coating amount of 50 g/L.

(3) Roasting: drying the coated catalyst carrier in a muffle furnace at 120° C. for 3 h, and then roasting in a muffle furnace at 550° C. for 3 h to obtain the cGPF catalyst.

Test Example

Ash Loading Test on Bench:

The cGPF catalysts prepared above were installed on 1.8LTGDI engines, respectively, and loaded with ash according to SBC cycle condition in GB18352.6-2016 Emission Limits and Measurement Methods of Light Vehicle Pollutants (Chinese National Stage VI). The engine oil mixed combustion method was adopted, and the maximum cycle bed temperature was 980° C., and the target loading amount of ash was 30 g/L.

WLTC Emission Test of Whole Vehicle:

CGPF catalysts prepared above were used as chassis catalysts respectively, and TWC catalysts (Φ118.4*100–750/2, Pd=103 $g/ft^3$, Rh=8 $g/ft^3$) were used as close-coupled catalysts to form a post-treatment system, and emission tests were conducted on a 1.6TGDI car. Type I emission test was carried out according to "GB18352.6-2016 Emission Limits and Measurement Methods of Light Vehicle Pollutants (Chinese National Stage VI)". In addition, pressure pipes were installed at the inlet and outlet of cGPF catalyst to detect the back pressure under WLTC cycle. The cyclic emission result of the catalyst at 1800 s and the maximum backpressure difference ΔP are recorded as follows.

| No. | CO(g/km) | THC(g/km) | NOx(g/km) | PN (PCs/km) | ΔP(kpa) |
|---|---|---|---|---|---|
| Example 1 | 0.220 | 0.033 | 0.037 | $2.4*10^{11}$ | 10.5 |
| Example 2 | 0.218 | 0.031 | 0.036 | $2.3*10^{11}$ | 10.1 |
| Example 3 | 0.223 | 0.034 | 0.038 | $2.4*10^{11}$ | 10.8 |
| Example 4 | 0.224 | 0.038 | 0.040 | $2.1*10^{11}$ | 12.3 |
| Example 5 | 0.226 | 0.037 | 0.039 | $2.0*10^{11}$ | 11.8 |
| Example 6 | 0.225 | 0.039 | 0.041 | $2.1*10^{11}$ | 12.7 |
| Comparative Example 1 | 0.358 | 0.045 | 0.044 | $1.5*10^{11}$ | 14.5 |
| Comparative Example 2 | 0.355 | 0.044 | 0.043 | $1.5*10^{11}$ | 14.4 |
| Comparative Example 3 | 0.361 | 0.046 | 0.045 | $1.6*10^{11}$ | 14.7 |
| Comparative Example 4 | 0.372 | 0.048 | 0.050 | $1.2*10^{11}$ | 18.2 |
| Comparative Example 5 | 0.371 | 0.047 | 0.049 | $1.3*10^{11}$ | 17.5 |
| Comparative Example 6 | 0.369 | 0.048 | 0.049 | $1.3*10^{11}$ | 17.9 |

According to the above experimental data, by applying the cerium-zirconium-aluminum-based composite material with higher density prepared by the method of the present invention in Examples 1-6 in the cGPF catalyst, the back pressure of cGPF catalyst after loading ash was significantly lower than that of cGPF catalyst made of conventional materials, and its exhaust emission purification effect was also better. therefore, the cerium-zirconium-aluminum-based composite material prepared by the method of the present invention can significantly improve the ash accumulation resistance of cGPF catalyst, which is beneficial to large-scale production and application of cGPF catalyst. Compared with the cerium-zirconium-aluminum-based composites prepared in Example 1, Comparative Examples 4-6 and Example 3, the density of the cerium-zirconium-aluminum-based composites in Comparative Examples 1-3 was significantly reduced, thus occupying more volume of pores on the catalyst carrier when applied to cGPF catalysts. Therefore, the porosity of cGPF catalysts prepared by using the cerium-zirconium-aluminum-based composites in Examples was higher than that of Comparative Examples, and the dynamic mass transfer of cGPF catalysts was better, and the purification ability of exhaust emission was better, and the ability to capture particulate matter in exhaust emission decreases.

What is claimed:

1. A method of preparing a cerium-zirconium-aluminum-based composite material, which comprises the following steps:
   (1) Dissolving pseudo-boehmite in citric acid aqueous solution, adjusting the pH value to 4-10 with ammonia water, filtering and drying after the reaction under stirring is completed to obtain a precipitate; roasting the precipitate at a temperature of 200-400° C. for 0.1-5 h to obtain a pre-treated material; wherein the mass ratio of pseudo-boehmite to citric acid is 5-20:1;
   (2) Adding the pre-treated material into a solution of mixed sol, adjusting the pH value to 4-10 with ammonia water after completely dissolution, filtering and drying after the reaction under stirring is completed to obtain a mixture precipitate; wherein the mixed sol is a sol containing cerium ions and zirconium ions;
   (3) Roasting the mixture precipitate at 500-600° C. for 1-10 h, and then at 800-1100° C. for 1-10 h to obtain the cerium-zirconium-aluminum composite material.

2. The method according to claim 1, wherein the mixed sol in step (2) is a sol which further contains one or more selected from the group consisting of yttrium ion, lanthanum ion, neodymium ion, praseodymium ion, palladium ion and strontium ion.

* * * * *